US012715258B2

(12) United States Patent
Furuta

(10) Patent No.: US 12,715,258 B2
(45) Date of Patent: Aug. 25, 2026

(54) VEHICLE BEHAVIOR CONTROL APPARATUS, VEHICLE BEHAVIOR CONTROL METHOD, AND NON-TRANSITORY COMPUTER READABLE RECORDING MEDIUM

(71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 18/798,102

(22) Filed: Aug. 8, 2024

(65) Prior Publication Data

US 2025/0074132 A1 Mar. 6, 2025

(30) Foreign Application Priority Data

Aug. 28, 2023 (JP) ................................ 2023-138198

(51) Int. Cl.
*B60G 17/0185* (2006.01)
*B60G 17/015* (2006.01)
*B60G 17/016* (2006.01)

(52) U.S. Cl.
CPC ..... *B60G 17/0185* (2013.01); *B60G 17/0152* (2013.01); *B60G 17/016* (2013.01);
(Continued)

(58) Field of Classification Search
CPC ............ B60G 17/0185; B60G 17/0152; B60G 17/016; B60G 2202/13; B60G 2400/10; B60G 2400/40; B60G 2800/80
(Continued)

(56) References Cited

U.S. PATENT DOCUMENTS 5,032,997 A * 7/1991 Kawagoe ........... B60K 23/0808 180/404
6,945,541 B2 * 9/2005 Brown ..................... B60G 3/06 280/5.507
(Continued)

FOREIGN PATENT DOCUMENTS

DE 102018129654 A1 5/2020
JP 2005162021 A * 6/2005 ............ B60G 17/00
(Continued)

OTHER PUBLICATIONS

Yan-Jun Liu, Actuator Failure Compensation-Based Adaptive Control of Active Suspension Systems with Prescribed Performance, Aug. 2020, IEEE, pp. 1-8 (Year: 2020).*

*Primary Examiner* — Kurt Philip Liethen
*Assistant Examiner* — Anthony Donald Taylor, Jr.
(74) *Attorney, Agent, or Firm* — Sughrue Mion, PLLC

(57) ABSTRACT

A vehicle behavior control apparatus comprises first to fourth suspensions provided on first to fourth wheels of a vehicle, respectively. The first to fourth suspensions include first to fourth actuators that apply vertical control forces to the first to fourth wheels, respectively. When a failure occurs in the fourth actuator other than the i-th actuator (i=1 to 3) among the first to fourth actuators, the vehicle behavior control apparatus executes the following first to third process. The first process is calculating a required value of a behavior parameter representing a behavior of the vehicle. The second process is converting the required value into an i-th required control force for the i-th actuator. The third process is controlling the behavior of the vehicle by controlling the i-th actuator based on the required control force.

11 Claims, 8 Drawing Sheets

(52) U.S. Cl.
CPC ...... *B60G 2202/13* (2013.01); *B60G 2400/10* (2013.01); *B60G 2400/40* (2013.01); *B60G 2800/80* (2013.01)

(58) Field of Classification Search
USPC ........................................................... 701/37
See application file for complete search history.

(56) References Cited

U.S. PATENT DOCUMENTS 8,116,939 B2 * 2/2012 Kajino ................. B60G 17/025 701/37
8,265,825 B2 * 9/2012 Kajino ............... B60G 17/0165 280/124.108
8,682,530 B2 * 3/2014 Nakamura ............. B60G 13/16 280/124.108
9,150,070 B2 * 10/2015 Luttinen .................. B60G 3/20
9,440,508 B2 * 9/2016 Lachica ........... B60G 17/01941
11,046,143 B1 * 6/2021 Aikin ................. B60G 17/0195
11,511,593 B2 * 11/2022 Lekon ................ B60G 17/0157
2006/0212199 A1 * 9/2006 Urababa ............ B60G 21/0555 701/38
2007/0176375 A1 * 8/2007 Barth ................. B60G 17/0152 280/5.5
2009/0121444 A1 * 5/2009 Bushko .............. B60G 17/0165 280/5.507
2012/0118194 A1 * 5/2012 Schneider ................. B61F 5/24 105/171
2012/0261893 A1 * 10/2012 Meitinger ................ B60G 3/20 280/124.13
2014/0188343 A1 * 7/2014 Yoshimura ............ B60W 10/08 701/41
2017/0008366 A1 * 1/2017 Füssl .................. B60G 21/0556
2017/0320368 A1 * 11/2017 Masamura ........... B60G 17/015
2021/0394573 A1 * 12/2021 Vente ................... B60G 17/019

FOREIGN PATENT DOCUMENTS

JP 2008308098 A * 12/2008 ........... B60G 17/015
JP 2009-073239 A 4/2009
JP 2009-083546 A 4/2009
JP 2010-179692 A 8/2010

* cited by examiner

VEHICLE BEHAVIOR CONTROL APPARATUS, VEHICLE BEHAVIOR CONTROL METHOD, AND NON-TRANSITORY COMPUTER READABLE RECORDING MEDIUM

CROSS-REFERENCE TO RELATED APPLICATION

The present disclosure claims priority to Japanese Patent Application No. 2023-138198, filed on Aug. 28, 2023, the contents of which application are incorporated herein by reference in their entirety.

TECHNICAL FIELD

The present disclosure relates to a technique for controlling a behavior of a vehicle.

BACKGROUND ART

In recent years, a technique has been considered in which a behavior of a vehicle is controlled by providing active suspensions on all four wheels of the vehicle, and applying a vertical control force independently to each wheel using each actuator. For example, Patent Literature 1 discloses a suspension control device that controls the drive of an actuator provided for each wheel in accordance with a predetermined control law, thereby controlling the heave, roll, and pitch of a vehicle so as to achieve both an improvement in ride comfort and an improvement in road contact performance.

In addition, the following Patent Literature 2 is a document showing the technical level of the present technical field.

LIST OF RELATED ART

Patent Literature 1: JP 2009073239 A
Patent Literature 2: JP 2010179692 A

SUMMARY

In the conventional behavior control of a vehicle in which all of the four wheels of the vehicle are provided with active suspensions, when a failure occurs in any one of the four actuators, a control force by the failed actuator cannot be appropriately obtained, and a desired behavior of the vehicle cannot be realized. For this reason, when a failure occurs in any of the actuators, the control is normally stopped. From the viewpoint of availability of the control, it is not desirable to stop the control due to the occurrence of a failure in one actuator even though the remaining three actuators operate normally.

An object of the present disclosure is, in view of the above problems, to provide a technique capable of improving the availability of control with respect to behavior control of a vehicle provided with active suspensions for all four wheels of the vehicle.

A first aspect of the present disclosure is directed to a vehicle behavior control apparatus.

The vehicle behavior control apparatus comprises:

first to fourth suspensions provided on first to fourth wheels of a vehicle, respectively; and a controller for controlling a behavior of the vehicle.

The first to fourth suspensions include first to fourth actuators that apply vertical control forces to the first to fourth wheels, respectively.

The controller is configured to, when a failure occurs in the fourth actuator other than the i-th actuator (i=1 to 3) among the first to fourth actuators, execute:

calculating a required value of a behavior parameter representing the behavior of the vehicle;

converting the required value of the behavior parameter into an i-th required control force for the i-th actuator; and controlling the behavior of the vehicle by controlling the i-th actuator based on the i-th required control force.

A second aspect of the present disclosure is directed to a vehicle behavior control method. Here, the vehicle comprises first to fourth suspensions provided on first to fourth wheels of the vehicle, respectively. The first to fourth suspensions including first to fourth actuators that apply vertical control forces to the first to fourth wheels, respectively.

The vehicle behavior control method, when a failure occurs in the fourth actuator other than the i-th actuator (i=1 to 3) among the first to fourth actuators, includes:

calculating a required value of a behavior parameter representing the behavior of the vehicle;

converting the required value of the behavior parameter into an i-th required control force for the i-th actuator; and controlling the behavior of the vehicle by controlling the i-th actuator based on the i-th required control force.

A third aspect of the present disclosure is directed to a vehicle behavior control program for controlling a behavior of a vehicle. Here, the vehicle comprises first to fourth suspensions provided on first to fourth wheels of the vehicle, respectively. The first to fourth suspensions including first to fourth actuators that apply vertical control forces to the first to fourth wheels, respectively.

The vehicle behavior control program causes a computer to, when a failure occurs in the fourth actuator other than the i-th actuator (i=1 to 3) among the first to fourth actuators, execute:

calculating a required value of a behavior parameter representing the behavior of the vehicle;

converting the required value of the behavior parameter into an i-th required control force for the i-th actuator; and controlling the behavior of the vehicle by controlling the i-th actuator based on the i-th required control force.

According to the present disclosure, even when a failure occurs in one of the four actuators, it is possible to continue the vehicle behavior control while the controllability is ensured by the remaining three actuators. It is thus possible to improve the availability of control.

DETAILED DESCRIPTION

1. Configuration Example of Vehicle Behavior Control Apparatus

Figure 1:
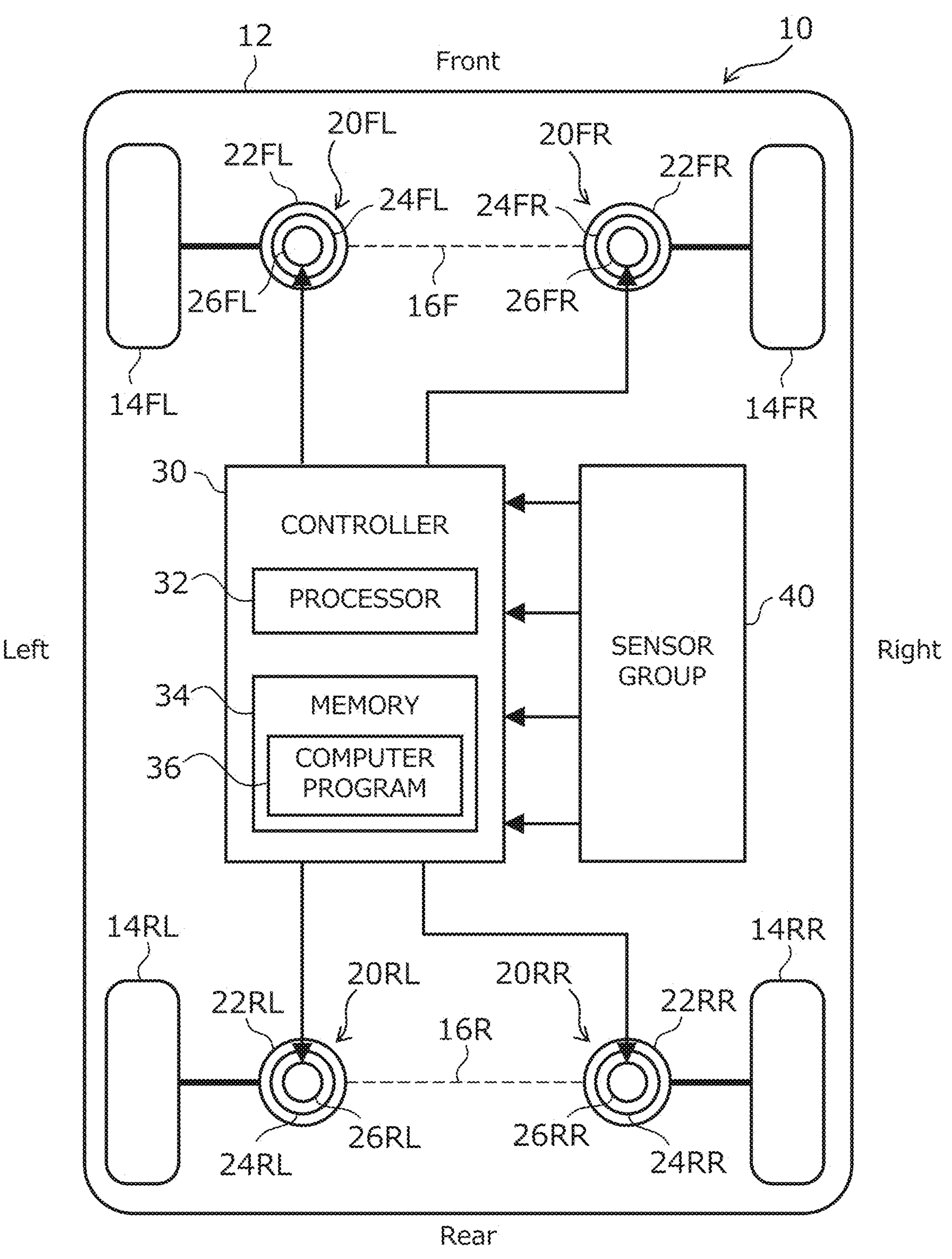
FIG. 1 is a conceptual diagram showing an example of a configuration of a vehicle behavior control apparatus.

FIG. 1 is a conceptual diagram showing an example of a configuration of a vehicle behavior control apparatus for controlling the behavior of a vehicle 10 according to the present embodiment. The vehicle 10 includes a left front wheel 14FL and a right front wheel 14FR on a front axle 16. And the vehicle 10 includes a left rear wheel 16R and a right rear wheel 14RL on a rear axle 14RR. The vehicle behavior control apparatus includes suspensions 20FL, 20FR, 20RL, and 20RR, a controller 30, and a sensor group 40.

The suspension 20FL is provided for the left front wheel 14FL, and suspends the left front wheel 14FL from a vehicle body 12. The suspension 20FL includes an actuator 26FL in addition to a spring 22FL and a shock absorber 24FL. The actuator 26FL is configured to be able to actively apply a vertical control force to the left front wheel 14FL. That is, the suspension 20FL is a fully active suspension.

The suspension 20FR is provided for the right front wheel 14FR and suspends the right front wheel 14FR from the vehicle body 12. The suspension 20FR includes an actuator 26FR in addition to a spring 22FR and a shock absorber 24FR. The actuator 26FR is configured to be able to actively apply a vertical control force to the right front wheel 14FR. That is, the suspension 20FR is a fully active suspension.

The suspension 20RL is provided for the left rear wheel 14RL, and suspends the left rear wheel 14RL from the vehicle body 12. The suspension 20RL includes an actuator 26RL in addition to a spring 22RL and a shock absorber 24RL. The actuator 26RL is configured to be able to actively apply a vertical control force to the left rear wheel 14RL. That is, the suspension 20RL is a fully active suspension.

The suspension 20RR is provided for the right rear wheel 14RR and suspends the right rear wheel 14RR from the vehicle body 12. The suspension 20RR includes an actuator 26RR in addition to a spring 22RR and a shock absorber 24RR. The actuator 26RR is configured to be able to actively apply a vertical control force the right rear wheel 14RR. That is, the suspension 20RR is a fully active suspension.

The configuration and mechanism of the actuator 26 are not particularly limited. An example of the configuration of the actuator 26 will be described later in Section 3.

The controller 30 is connected to the sensor group 40 via an in-vehicle network such as a controller area network (CAN). The controller 30 acquires signals from the sensor group 40. The sensor group 40 includes sensors that measure physical quantities related to the behavior of the vehicle 10, such as an accelerometer, a vehicle height sensor, and a wheel speed sensor. The controller 30 is also connected to the actuators 26FL, 26FR, 26RL, and 26RR via the in-vehicle network.

The controller 30 includes a processor 32 (processor 32 may also be referred to as "processing circuitry") and a memory 34 coupled to the processor 32. The processor 32 executes various processes. The memory 34 stores a computer program 36 executable by the processor 32 and various information related to the computer program 36. The computer program 36 may be recorded in a computer-readable recording medium. The functions of the controller 30 are realized by cooperation between the processor 32 executing the computer program 36 and the memory 34.

The controller 30 executes "vehicle behavior control" for controlling the behavior of the vehicle 10. Examples of the vehicle behavior control include on-spring feedback control, under-spring feedback control, attitude control, preview control, and the like. The on-spring feedback control suppresses the vibration of an on-spring member based on an on-spring state quantity calculated using a measurement value of an on-spring accelerometer. The under-spring feedback control suppresses the vibration of an under-spring member based on a under-spring state quantity calculated using a measurement value of the on-spring accelerometer and the vehicle height sensor. The attitude control controls the attitude in response to steering and acceleration and deceleration. The preview control uses a camera image and a database of high-definition map data to predict the road surface condition and suppress the vibration. These various controls may be combined.

The controller 30 executes the vehicle behavior control by controlling actuators 26FL, 26FR, 26RL, and 26RR of suspensions 20FL, 20FR, 20RL, and 20RR based on the signals obtained by the sensor group 40. In the vehicle behavior control, a required control force in the vertical direction is calculated for each of the four wheels of the vehicle 10 depending on the purpose. The controller 30 can realize a desired behavior of the vehicle 10 by controlling each actuator 26FL, 26FR, 26RL, and 26RR such that the vertical control force applied to each wheel 1414FL, 14FR, 14RL, 14RR becomes the calculated required control force.

By the way, in the vehicle behavior control apparatus, each of the four actuators 26FL, 26FR, 26RL, and 26RR may become uncontrollable due to occurrence of a failure. If a failure occurs in any one of the actuators 26, the control force by the failed actuator 26 cannot be appropriately obtained. As a result, in a normal control for achieving the required control force of each wheel 14 by controlling the four actuators 26FL, 26FR, 26RL, and 26RR, the desired behavior of the vehicle 10 cannot be realized. On the other hand, even when a failure occurs in any one of the actuators 26, the remaining three actuators 26 may be able to be normally controlled.

Therefore, when a failure occurs in any one of the actuators 26, the controller 30 according to the present embodiment executes the vehicle behavior control by the remaining three actuators 26. As will be described below, with only the remaining three actuators 26, it is possible to achieve controllability equivalent to that of the normal vehicle behavior control by the four actuators 26. The vehicle behavior control by the three actuators 26 will be described in more detail below.

2.3 Actuator Control

As described above, when a failure occurs in any one of the actuators 26, the controller 30 according to the present embodiment executes the vehicle behavior control by the remaining three actuators 26 (hereinafter, also simply referred to as "3 actuator control"). Hereinafter, the 3 actuator control will be described, particularly taking as an example a case where a failure occurs in the actuator 14FL of the left front wheel 26FL.

Figure 2:
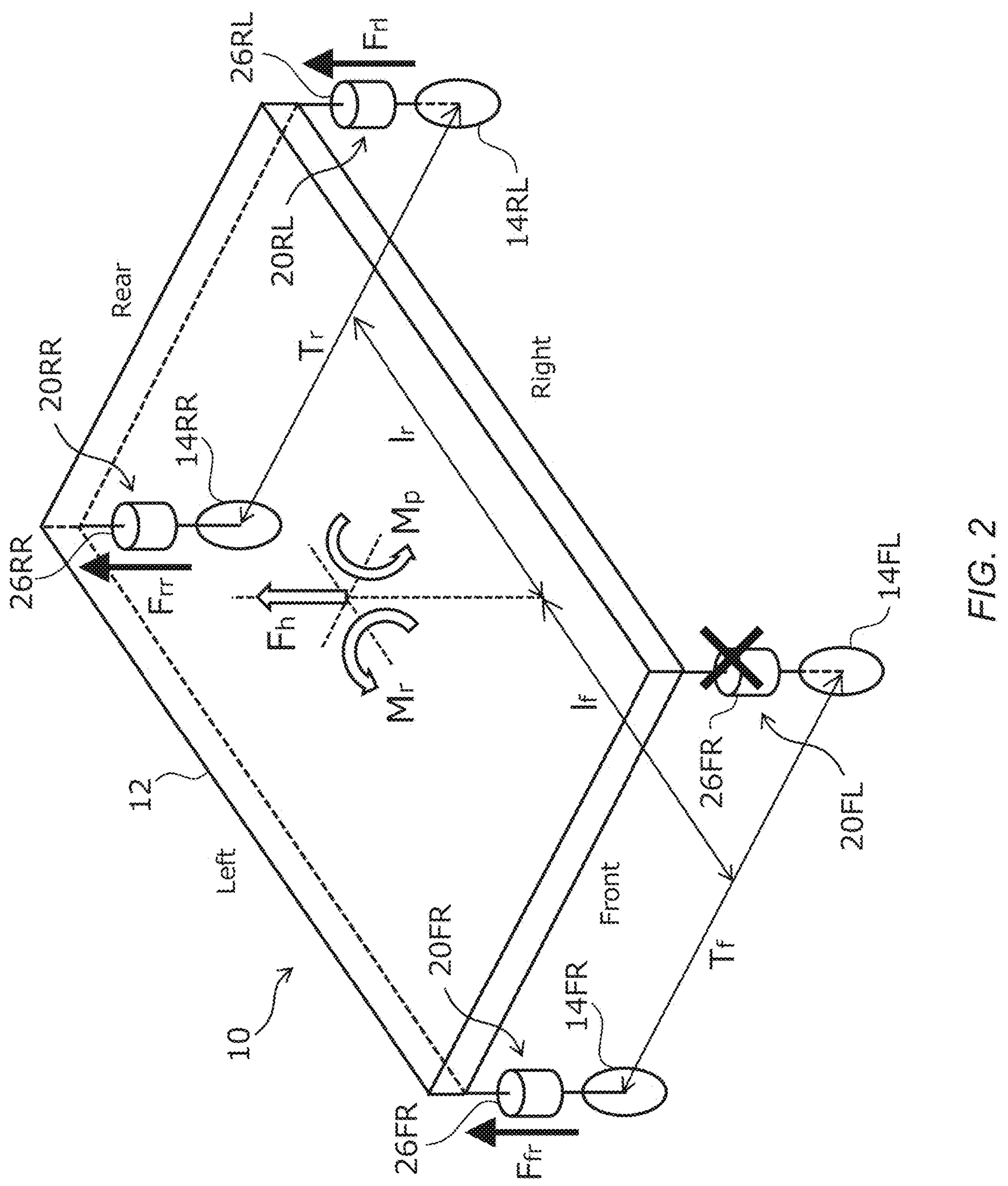
FIG. 2 is a conceptual diagram for explaining vehicle behavior control by three actuators.

FIG. 2 shows a behavior model for explaining the 3 actuator control. The behavior of the vehicle 10 is represented by a behavior parameter. In the behavior model shown in FIG. 2, the behavior parameter includes motion modes at the on-spring centroid of the vehicle 10, that is, a roll moment $M_r$, a pitch moment $M_p$, and a heave force $F_h$. Hereinafter, the motion mode including the roll moment $M_r$, the pitch moment $M_p$, and the heave force $F_h$ is referred to as a centroid 3 modes.

In the 3 actuator control, the required control force in the vertical direction is calculated for each of the four wheels of the vehicle 10 in accordance with the purpose of the vehicle behavior control. Hereinafter, the required control force calculated for each of the four wheels of the vehicle 10 is particularly referred to as "base required control force". In the 3 actuator control, the controller 30 first converts the base required control force for the four wheels into the required values of the centroid 3 modes (the behavior parameter). Now, the base required control force for the left front wheel 14FL is $F_{fli}$, the base required control force for the right front wheel 14FR is $F_{fri}$, the base required control force for the left rear wheel 14RL is $F_{rli}$, and the base required control force for the right rear wheel 14RR is $F_{rri}$. At this time, the controller 30 converts the base required controls force $F_{fli}$, $F_{fri}$, $F_{rli}$, and $F_{rri}$ for the four wheels into the required values of the centroid 3 modes according to the following equation (1).

Formula 1

$$\begin{bmatrix} F_h \\ M_r \\ M_p \end{bmatrix} = \begin{bmatrix} 1 & 1 & 1 & 1 \\ \frac{-T_f}{2} & \frac{T_f}{2} & \frac{-T_r}{2} & \frac{T_r}{2} \\ -l_f & -l_f & l_r & l_r \end{bmatrix} \begin{bmatrix} F_{fri} \\ F_{fli} \\ F_{rri} \\ F_{rli} \end{bmatrix} \tag{1}$$

In equation (1), $l_f$, $l_r$, $T_f$, and $T_r$ are the distance between the front axle 16 and the centroid, the distance between the rear axle 16R and the centroid, the front tread, and the rear tread, respectively (see FIG. 2). These parameters are given in advance as specification information of the vehicle 10. The controller 30 calculates the required values ($F_h$, $M_r$, $M_p$) of the centroid 3 modes based on the specification information of the vehicle 10 and the base required control forces $F_{fli}$, $F_{fri}$, $F_{rli}$, and $F_{rri}$ for the four wheels. The required values of the centroid 3 modes may include a roll moment, a pitch moment, and a heave force required for attitude control associated with steering and acceleration and deceleration.

After the required values $F_h$, $M_r$, and $M_p$ of the centroid 3 modes are calculated, the controller 30 converts the required values $F_h$, $M_r$, and $M_p$ of the centroid 3 modes into the required control forces $F_{fr}$, $F_{rr}$, and Fri for the three actuators 26FR, 26RR, and 26RL according to the following equation (2).

Formula 2

$$\begin{bmatrix} F_{fr} \\ F_{rr} \\ F_{rl} \end{bmatrix} = \begin{bmatrix} 1 & 1 & 1 \\ \frac{-T_f}{2} & \frac{-T_r}{2} & \frac{T_r}{2} \\ -l_f & l_r & l_r \end{bmatrix}^{-1} \begin{bmatrix} F_h \\ M_r \\ M_p \end{bmatrix} \tag{2}$$

Then, the controller 30 controls the actuator 14FR so that the vertical control force applied to the right front wheel 26FR becomes the required control force $F_{fr}$. Similarly, the controller 30 controls the actuator 14RR so that the vertical control force applied to the right rear wheel 26RR becomes the required control force Fr. Similarly, the controller 30 controls the actuator 14RL so that the vertical control force applied to the left rear wheel 26RL becomes the required control force $F_{rl}$.

In this way, in the 3 actuator control, the required values of the centroid 3 modes are distributed to the three actuators 26FR, 26RR, and 26RL, and thus a desired behavior including all of roll, pitch, and heave is realized in the vehicle 10. That is, the desired vehicle behavior can be realized only by the three actuators 26FR, 26RR, and 26RL.

The control method of the actuator 26 may be position control (angle control) instead of force control (torque control). In the case of position control (angle control), the controller 30 calculates the required position control amounts for the three actuators 26FR, 26RR, and 26RL so as to realize the required control forces $F_{fr}$, $F_{rr}$, and $F_{rl}$ for the three actuators 26FR, 26RR, and 26RL, which are expressed by the above equation (2). Then, the controller 30 performs position control of the actuators 26FR, 26RR, and 26RL in accordance with the required position control amounts.

In the above description, the case where a failure occurs in the actuator 14FL of the left front wheel 26FL is taken as an example. However, as understood from the above description, even when a failure occurs in the actuator 26 of another wheel 14, the same 3 actuator control can be performed.

To generalize, it is as follows. The first wheel 14-1 to the fourth wheel 14-4 are provided with active suspensions, a first suspension 20-1 to a fourth suspension 20-4, respectively. The first suspension 20-1 to the fourth suspension 20-4 include a first actuator 26-1 to a fourth actuator 26-4 that apply vertical control forces to the first wheel 14-1 to the fourth wheel 14-4, respectively. Now, it is assumed that a failure occurs in the fourth actuator 26-4 other than the i-th actuator **26-*i* (i=1 to 3) among the first actuator 26-1 to the fourth actuator 26-4. At this time, the controller 30 executes the 3 actuator control by the i-th actuator 26-*i***.

In 3 actuator control, the controller 30 calculates the required value of the behavior parameter representing the behavior of the vehicle 10 (see equation (1)). Subsequently, the controller 30 converts the required value of the behavior parameter into the i-th required control force Fi for the i-th actuator **26-*i* (see equation (2)). The controller 30 controls the i-th actuator 26-*i* based on the i-th required control force Fi to control the behavior of the vehicle 10. It is thus, with only the remaining three actuators 26, possible to achieve controllability equivalent to that of the normal vehicle behavior control by the four actuators 26. As a result, even when a failure occurs in any one of the actuators 26**, the vehicle behavior control can be continued while ensuring the controllability, and thus the availability of control is improved.

Figure 3:
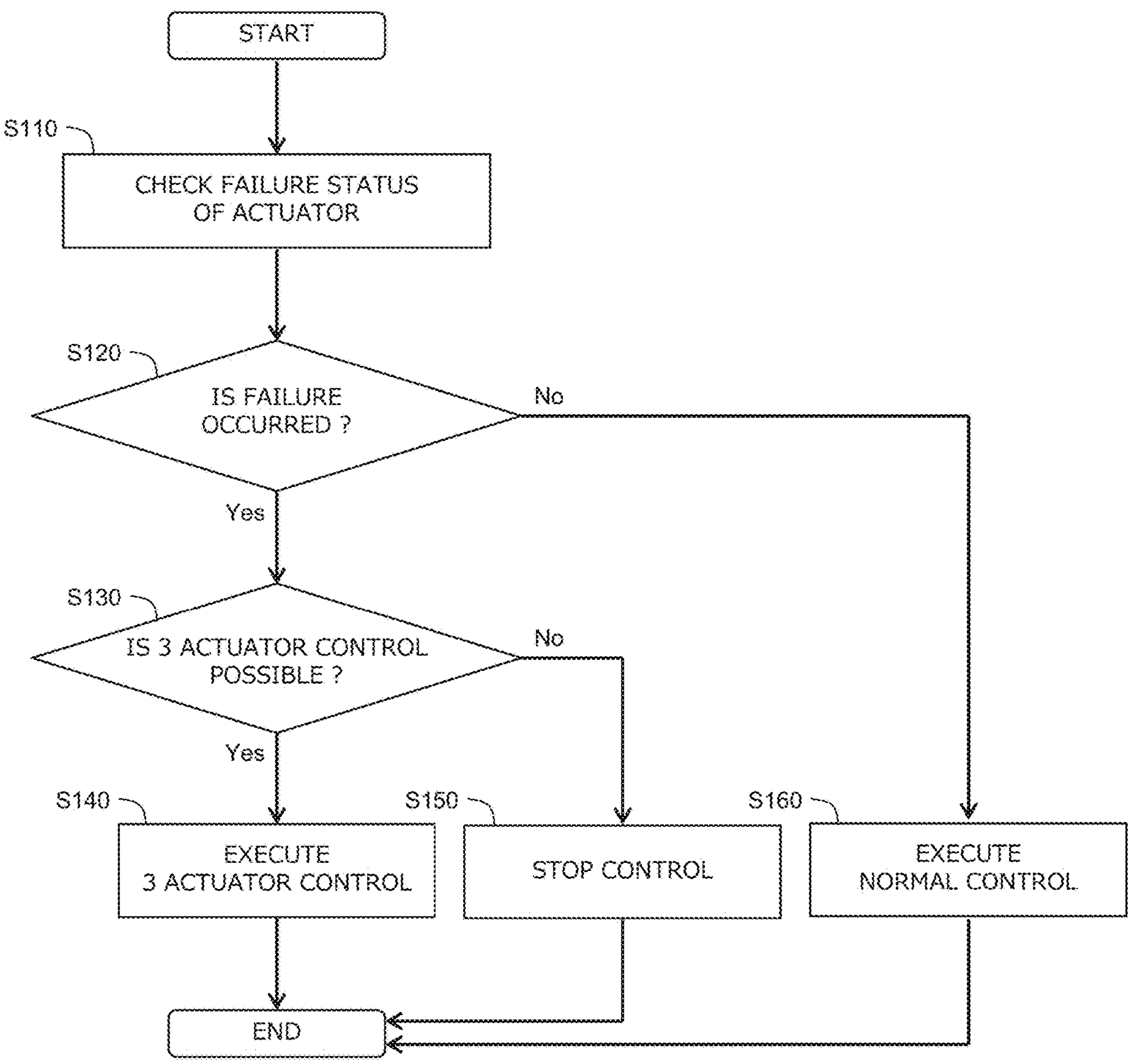
FIG. 3 is a flowchart showing a process executed by a controller according to an embodiment.

FIG. 3 is a flowchart showing an example of a process executed by the controller 30 according to the present embodiment. The process according to the flowchart shown in FIG. 3 may be repeatedly executed at a predetermined processing cycle while the vehicle behavior control apparatus is activated.

In step S110, the controller 30 checks the failure status of the four actuators 26FL, 26FR, 26RL, and 26RR. For example, the controller 30 acquires information on the failure status of each of the four actuators 26FL, 26FR, 26RL, and 26RR via a diagnosis system provided in the vehicle 10. At this time, the controller 30 may acquire information on the type of the failure in addition to the information on whether the failure has occurred.

When a failure has not occurred in any of the four actuators 26FL, 26FR, 26RL, and 26RR (step S120; No), the controller 30 executes normal vehicle behavior control by the four actuators 26FL, 26FR, 26RL, and 26RR (step S160).

When a failure occurs in the four actuators 26FL, 26FR, 26RL, and 26RR (step S120; Yes), the controller 30 determines whether or not 3 actuator control is possible (step S130). A case where the 3 actuator control is possible is a case where a failure occurs in one of the four actuators 26FL, 26FR, 26RL, and 26RR. In other words, that is a case where three actuators 26 of the four actuators 26FL, 26FR, 26RL, and 26RR can be controlled normally. For example, the controller 30 determines whether or not 3 actuator control is possible based on the information acquired in step S110.

When the 3 actuator control is possible (step S130; Yes), the controller 30 executes the 3 actuator control (step S140). On the other hand, when the 3 actuator control cannot be executed (step S130; No), the controller 30 stops the vehicle behavior control (step S150).

Figure 4:
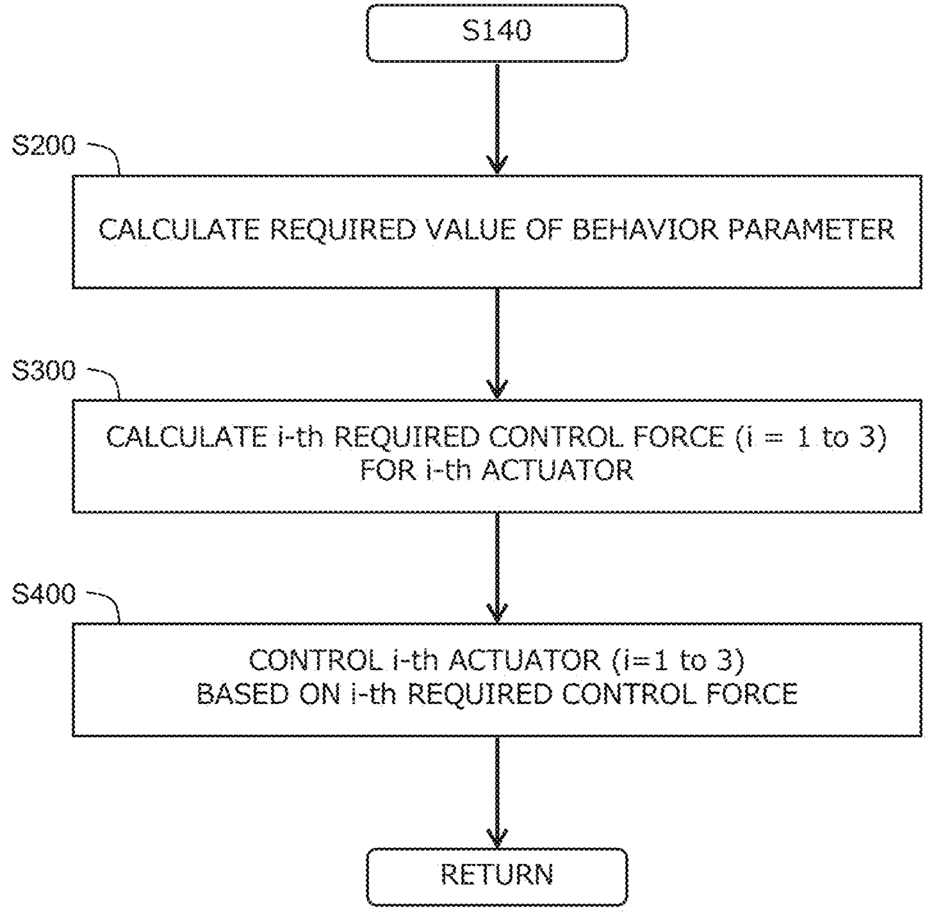
FIG. 4 is a flowchart showing a process executed by the controller according to the embodiment in vehicle behavior control by the three actuators.

FIG. 4 is a flowchart showing an example of a process executed by the controller 30 with respect to the 3 actuator control. FIG. 4 shows a generalized case where the 3 actuator control by the i-th actuator 26-*i* (i=1 to 3) is executed on the assumption that a failure has occurred in the fourth actuator 26-4 other than the i-th actuator 26-*i* (i=1 to 3) among the first actuator 26-1 to the fourth actuator 26-4.

In step S200, the controller 30 calculates the required value of the behavior parameter representing the behavior of the vehicle 10 (see equation (1)).

Next, in step S300, the controller 30 converts the required value of the behavior parameter into the i-th required control force Fi for the i-th actuator 26-*i* (see equation (2)).

Then, in step S400, the controller 30 performs the vehicle behavior control by controlling the i-th actuator 26-*i* based on the i-th required control force Fi.

The controller 30 executes the process in this way, thereby realizing the function of the vehicle behavior control apparatus according to the present embodiment. Furthermore, the vehicle behavior control method according to the present embodiment is implemented by the process executed by the controller 30 in this way. Furthermore, the vehicle behavior control program according to the present embodiment is realized by the computer program 36 that causes the controller 30 to execute the process in this way.

3. Configuration Example of Actuator

Figure 5:
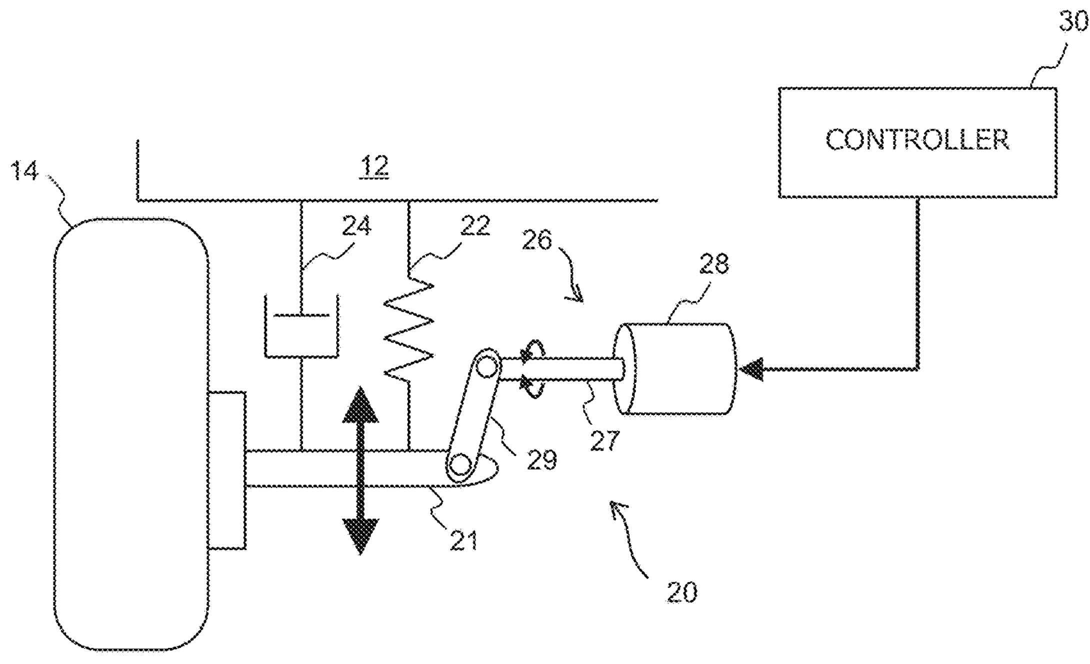
FIG. 5 is a diagram for explaining an example of a configuration of an actuator.

FIG. 5 is a diagram for explaining an example of the configuration of the actuator 26. In the example shown in FIG. 5, the actuator 26 includes a motor 28 supported by an on-spring structure, and a torsion bar 27 having one end connected to an output shaft of the motor 28. The other end of the torsion bar 27 is connected to an under-spring member 21 (e.g., a suspension arm) via a linkage 29. The operation of the motor 28 is controlled by the controller 30. When the motor 28 rotates, the torsion bar 27 is deformed, and a reaction force of the torsion bar 27 is converted into a vertical force through the linkage 29 and transmitted to the under-spring member 21 and the wheel 14. As described above, the actuator 26 can actively apply a vertical control force to the under-spring member 21 and the wheel 14 by deforming the torsion bar 27.

In addition, when the vehicle 10 is accelerated or decelerated, or steered, an external force input from the under-spring member 21 is transmitted to the output shaft of the motor 28 via the linkage 29 and the torsion bar 27. The torsion bar 27 and the linkage 29 may be referred to as a transmission member that transmits force between the motor 28, the under-spring member 21, and the wheel 14.

Figure 6:
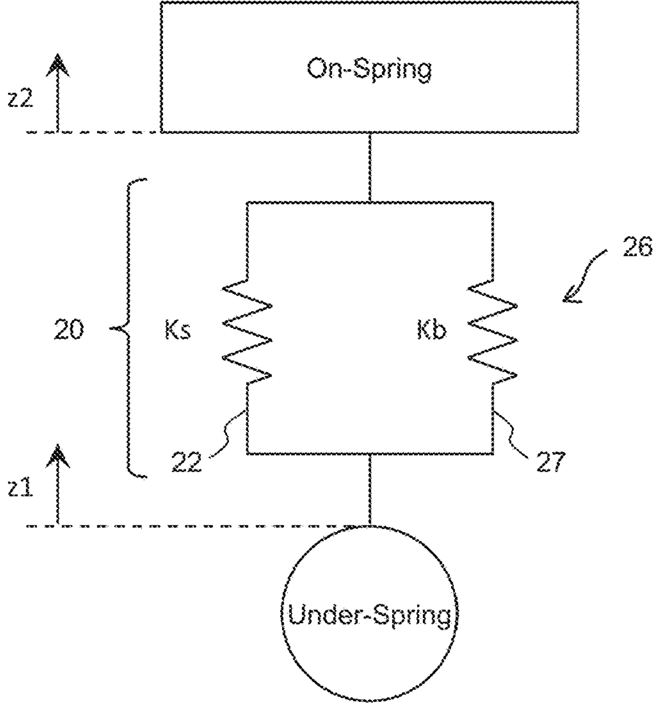
FIG. 6 is a diagram showing a model of a suspension.

FIG. 6 is a diagram showing a model of the suspension 20 in the case of the actuator 26 shown in FIG. 5. The spring 22 and the torsion bar 27 function as a parallel spring provided between an on-spring portion and a under-spring portion. Ks is the stiffness of the spring 22, and Kb is the stiffness of the torsion bar 27. As the reaction force generated in the torsion bar 27 increases, the suspension 20 becomes harder.

4. Offset Reaction Force Caused by Failure of Actuator

Continuing, consider the actuator 26 shown in FIGS. 5 and 6. The types of failures that occur in the actuator 26 are roughly classified into the following two types.

(1) fixation failure: fixation of an operation position (motor angle) due to motor sticking, control failure, or the like (2) shut-off failure: shut-off of force transmission due to breakage of the linkage 29, fracture of the torsion bar 27, or the like, or shut-off of output of the actuator 26 due to power loss or the like.

Figure 7:
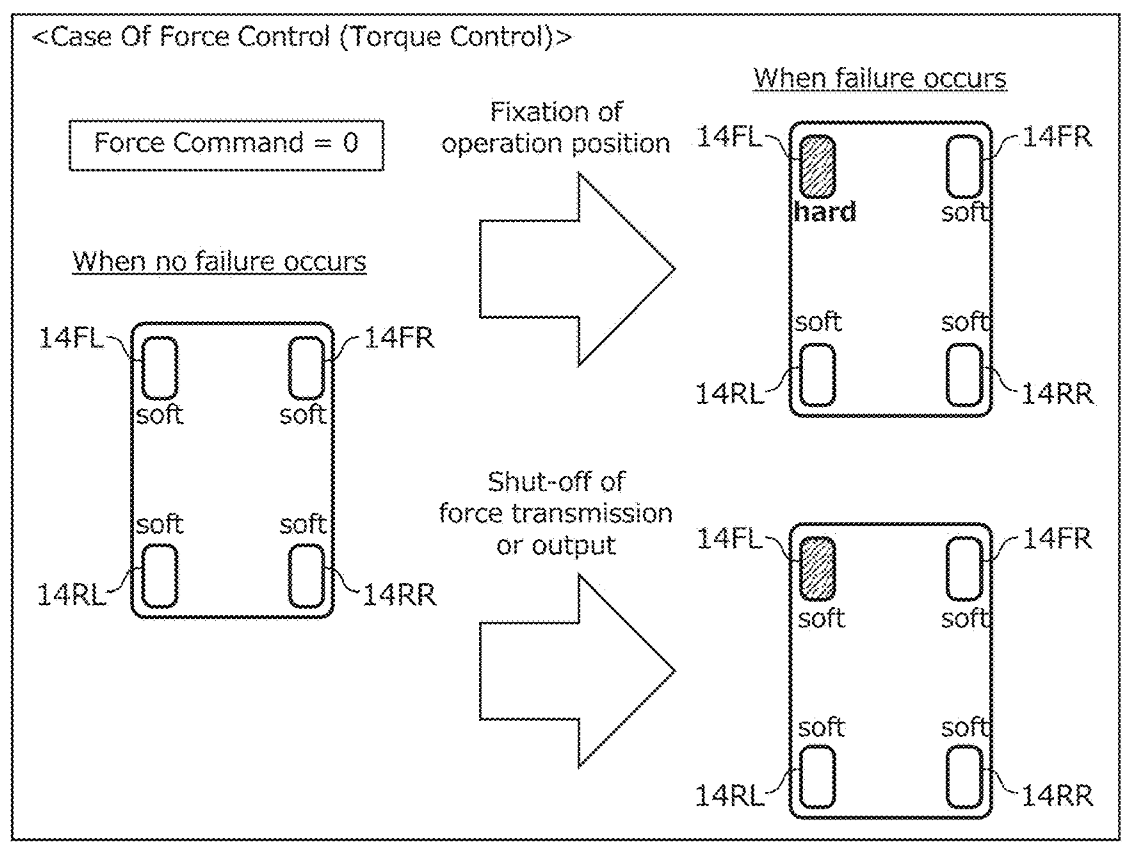
FIG. 7 is a conceptual diagram for explaining a situation in which a failure occurs in one actuator.
Figure 7:
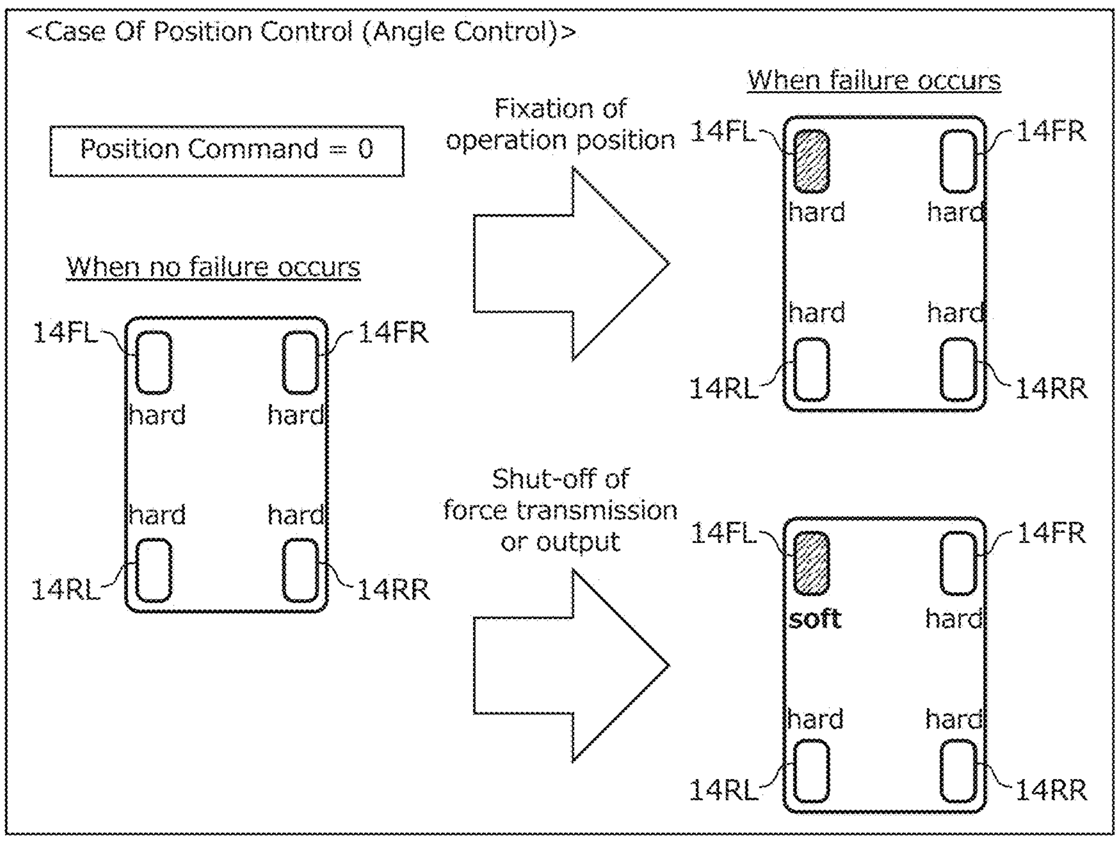

FIG. 7 is a conceptual diagram for considering a situation in which a failure occurs in one actuator 26. As an example, it is assumed that a failure occurs in the actuator 14FL of the left front wheel 26FL. For the sake of simplicity, it is assumed that the control command values for all the actuators 26 are zero. Then, a case where an external force is input to the torsion bar 27 from the under-spring member 21 side due to at least one of acceleration and deceleration and steering of the vehicle 10 will be considered.

4.1 Case of Force Control (Torque Control)

The force commands for all actuators 26 are assumed to be zero. In the normal actuators 26FR, 26RL, and 26RR, an external force from the under-spring member 21 side is input to the motor 28 via the torsion bar 27. Since the force command is zero and the motor 28 does not output a force, the motor 28 also rotates in response to the rotation of the torsion bar 27. Therefore, the reaction force (torsion moment) generated in the torsion bar 27 is zero or extremely small. On the other hand, the situation regarding the actuator 14FL of the left front wheel 26FL in which the failure occurs is as follows.

First, a case where the failure of the actuator 26FL is "fixation failure" will be considered. In this case, even if an external force from the under-spring member 21 side is input to the motor 28, the motor 28 does not rotate. Therefore, the torsion bar 27 is twisted in response to the external force applied from the under-spring member 21. That is, a reaction force (torsion moment) corresponding to the external force input from the under-spring member 21 side is generated in the torsion bar 27. This means that the suspension 14FL of the left front wheel 20FL in which the fixation failure occurs is "harder" than the suspensions 14FR, 14RL, and 14RR of the other wheels 20FR, 20RL, and 20RR. That is, the imbalance in suspension hardness occurs between the left front wheel 14FL where the fixation failure occurs and the other wheels 14FR, 14RL, and 14RR. Such an imbalance in suspension hardness can cause, during acceleration, deceleration, and steering, abnormalities in the tilt of the vehicle body and a sense of discomfort. Furthermore, the imbalance in suspension hardness causes a decrease in control performance, excessive oversteering or understeering, and the like.

Next, a case where the failure of the actuator 26FL is “shut-off failure” will be considered. A case where the force transmission is shut-off due to breakage of the linkage 29, fracture of the torsion bar 27, or the like is equivalent to a case where the stiffness Kb (see FIG. 6) of the torsion bar 27 is zero. Therefore, even if an external force is input, a reaction force is not generated in the torsion bar 27. When the output of the motor 28 is shut-off, it is equivalent to the force command being zero. In any case, the hardness of the suspension 14FL of the left front wheel 20FL in which the shut-off failure occurs is equivalent to the hardness of the suspensions 14FR, the 14RL, and the 14RR of the other wheels 20FR, the 20RL, and the 20RR. No imbalance occurs as in the case of the fixation failure described above.

4.2 Case of Position Control (Angle Control)

The position commands for all actuators 26 are assumed to be zero. In the normal actuators 26FR, 26RL, and 26RR, an external force from the under-spring member 21 side is input to the motor 28 via the torsion bar 27. Since the position command is zero and the position of the motor 28 does not change, the torsion bar 27 is twisted in response to the external force input from the under-spring member 21 side. That is, a reaction force (torsion moment) corresponding to the external force input from the under-spring member 21 side is generated in the torsion bar 27. On the other hand, the situation regarding the actuator 14FL of the left front wheel 26FL in which the failure occurs is as follows.

First, a case where the failure of the actuator 26FL is “shut-off failure” will be considered. A case where the force transmission is shut-off due to breakage of the linkage 29, fracture of the torsion bar 27, or the like is equivalent to a case where the stiffness Kb (see FIG. 6) of the torsion bar 27 is zero. Therefore, even if an external force is input, a reaction force is not generated in the torsion bar 27. When the output of the motor 28 is shut-off, the motor 28 does not output a force, and thus the motor 28 also rotates in response to the rotation of the torsion bar 27. Therefore, the reaction force generated in the torsion bar 27 is zero or extremely small. This means that the suspension 14FL of the left front wheel 20FL where the shut-off failure occurs is “softer” than the suspensions 14FR, 14RL, and 14RR of the other wheels 20FR, 20RL, and 20RR. That is, the unbalance of the suspension hardness occurs between the left front wheel 14FL where the shut-off failure occurs and the other wheels 14FR, 14RL, and 14RR. Such an imbalance in suspension hardness can cause, during acceleration, deceleration, and steering, abnormalities in the tilt of the vehicle body and a sense of discomfort. Furthermore, the imbalance of suspension hardness causes a decrease in control performance, excessive oversteering or understeering, and the like.

Next, a case where the failure of the actuator 26FL is “fixation failure” will be considered. In this case, even if an external force from the under-spring member 21 side is input to the motor 28, the motor 28 does not rotate. This is equivalent to the position command being zero. Therefore, the hardness of the suspension 14FL of the left front wheel 20FL where the fixation failure occurs is equivalent to the hardness of the suspensions 14FR, the 14RL, and the 14RR of the other wheels 20FR, the 20RL, and the 20RR. No imbalance occurs as in the case of the shut-off failure described above.

4.3 Offset Reaction Force

As described above, when a failure of the actuator 26FL using the torsion bar 27 occurs, there is a possibility that an imbalance in suspension hardness occurs between the left front wheel 14FL and the other wheels 14FR, 14RL, and 14RR. In the above description, for the sake of simplicity, it is assumed that the control command values for all the actuators 26 are zero, but even when some vehicle behavior control is performed by the controller 30, the imbalance in suspension hardness similarly continues to exist. Such an imbalance in suspension hardness can cause, during acceleration, deceleration, and steering, abnormalities in the tilt of the vehicle body and a sense of discomfort. Furthermore, the imbalance in suspension hardness causes a decrease in control performance, excessive oversteering or understeering, and the like. Therefore, when the failure of the actuator 26FL occurs, it is desirable to appropriately perform the above-described 3 actuator control in consideration of the imbalance in suspension hardness.

Then, “offset reaction force” is introduced as a parameter indicating the degree of the imbalance in suspension hardness caused by the occurrence of the failure. The offset reaction force is a “difference” in a reaction force between when a failure occurs and when it does not occur. More specifically, the offset reaction force is a difference between the reaction force generated in the torsion bar 27 of the actuator 26FL due to an external force input from the under-spring member 21 side when a failure occurs and that when a failure does not occur. That is, the offset reaction force is a “difference” between the reaction force generated in the torsion bar 27 of the actuator 26FL due to at least one of acceleration and deceleration and steering of the vehicle 10 when a failure occurs and that when a failure does not occur. The larger the offset reaction force, the larger the “difference” between when a failure occurs and when a failure does not occur.

As shown in FIG. 7, the offset reaction force depends on whether the control method of the actuator 26 is force control or position control. The offset reaction force depends on whether the type of failure of the actuator 26FL is fixation failure or shut-off failure. When the control method is force control and the type of failure is fixation failure, the offset reaction force is generated according to the input external force. When the control method is force control and the type of failure is shut-off failure, the offset reaction force is zero. When the control method is position control and the type of failure is shut-off failure, the offset reaction force is generated according to the input external force. When the control method is position control and the type of failure is fixation failure, the offset reaction force is zero.

According to the present embodiment, when a failure of the actuator 26FL occurs, the above-described 3 actuator control is performed in consideration of the offset reaction force. Hereinafter, the 3 actuator control considering the offset reaction force will be described in detail.

5.3 Actuator Control Considering Offset Reaction Force

The controller 30 according to the present embodiment is further configured to calculate the required value of the behavior parameter in consideration of the offset reaction force in the 3 actuator control. Hereinafter, calculation of the required value of the behavior parameter in consideration of the offset reaction force in each of a case where the force control (torque control) is performed on each actuator 26 and a case where the position control (angle control) is performed on each actuator 26 will be described. In the following description, it is assumed that a failure occurs in the fourth actuator 26-4 other than the i-th actuator **26-*i* (i=1 to 3) among the first actuator 26-1 to the fourth actuator 26-4, and the 3 actuator control by the i-th actuator 26-*i*** (i=1 to 3) is executed.

5.1 Case of Force Control (Torque Control)

As shown in FIG. 7, when the failure of the fourth actuator 26-4 is fixation failure, the imbalance in suspension hardness occurs. More specifically, the fourth suspension 20-4 is harder than the other suspensions 20 by the amount of the offset reaction force. That is, in the fourth actuator 26-4, an extra torsion bar reaction force is generated by the amount of the offset reaction. Therefore, the controller 30 calculates the required value of the behavior parameter so that the offset reaction force caused by the fixation failure is cancelled. Specifically, the controller 30 executes the process as follows.

First, the controller 30 adjusts the fourth base required control force by subtracting the offset reaction force from the fourth base required control force calculated for the fourth wheel 14-4. When the fourth base required control force is $F_{4b}$ and the offset reaction force is $F_{xy}$, the adjusted fourth base required control force $F'_{4b}$ is expressed by the following equation (3). Then, the controller 30 calculates the required value of the behavior parameter based on the i-th base required control force calculated for the i-th wheel **14-*i*** and the adjusted fourth base required control force $F'_{4b}$ (see equation (1)).

Formula 3

$$F'_{4b} = F_{4b} - F_{xy} \tag{3}$$

Here, the offset reaction force $F_{xy}$ is a reaction force generated in the torsion bar of the fourth actuator 26-4 due to acceleration, deceleration, or steering. Therefore, the offset reaction force $F_{xy}$ can be calculated as follows.

First, with respect to the acceleration and deceleration input, a suspension sharing force $F_x$ of the fourth wheel 14-4 excluding a suspension link reaction force is calculated by the following equation (4).

Formula 4

$$F_x = \frac{1}{2}\left\{-\left(\frac{H}{l}ma_{xp} - ma_{xp}\alpha_{xp}\tan\theta_l\right) + \left(\frac{H}{l}ma_{xm} - ma_{xm}\alpha_{xm}\tan\theta_I - ma_{xm}\alpha_{xm}(1-\alpha_k)\tan\theta_J\right)\right\} \tag{4}$$

Here, each parameter is defined as follows.

H: height of on-spring centroid l: wheel base m: on-spring mass $a_{xp}$: acceleration side of longitudinal G-forces $a_{xm}$: deceleration side of longitudinal G-forces $\alpha_{xp}$: front driving force distribution $\alpha_{xm}$: front braking force distribution $\alpha_k$ front regeneration ratio tan $\theta_I$: suspension link inclination angle in side view with respect to wheel center (I point)

tan $\theta_J$: suspension link inclination angle in side view with respect to tire ground contact point (J point)

In the above equation (4), it is assumed that the driving force and the regenerative force act on the I point. In addition, the longitudinal G-forces of the vehicle 10 may be estimated based on a required torque or a required force of an engine or a drive motor, and a required force of braking or regeneration. Alternatively, the longitudinal G-forces may be acquired by a sensor.

Next, with respect to the steering input, a suspension sharing force Fy of the fourth wheel 14-4 excluding a suspension link reaction force is calculated by the following equation (5).

Formula 5

$$F_y = \frac{H}{2T_f}ma_y\gamma - C_{pf}\left(\delta - \beta - \frac{l_f}{V}r\right)\tan\theta_y \tag{5}$$

Here, each parameter is defined as follows.

β: vehicle body slip angle

V: vehicle speed r: yaw rate

γ: front weighted movement distribution ratio $a_y$: lateral G-forces $C_{pf}$: front wheel cornering power tan $\theta_y$: suspension link inclination angle in rear view The lateral G-forces of the vehicle 10 may be estimated from a steering angle, the vehicle speed, and the like. Alternatively, the lateral G-forces may be acquired by a sensor.

The offset reaction force $F_{xy}$ can be calculated by the following equation (6) from the suspension sharing force $F_x$ of the fourth wheel 14-4 with respect to the acceleration and deceleration input and the suspension sharing force $F_y$ of the fourth wheel 14-4 with respect to the steering input. Here, $K_{bf}$ is the assumed stiffness of the torsion bar (including bush influence and link efficiency), and $K_{sf}$ is the vertical stiffness of the suspension (excluding the amount of the torsion bar).

Formula 6

$$F_{xy} = \frac{K_{bf}(F_x + F_y)}{K_{bf} + K_{sf}} \tag{6}$$

In this way, when each actuator 26 is subjected to force control (torque control), the controller 30 can calculate the required value of the behavior parameter in consideration of the offset reaction force. It is thus possible to eliminate the misalignment caused by the offset reaction force in the 3 actuator control. Note that in the case of shut-off failure, the offset reaction force is zero. Therefore, in this case, the controller 30 may calculate the required value of the behavior parameter in the same manner as in the case of the normal control.

Figure 8:
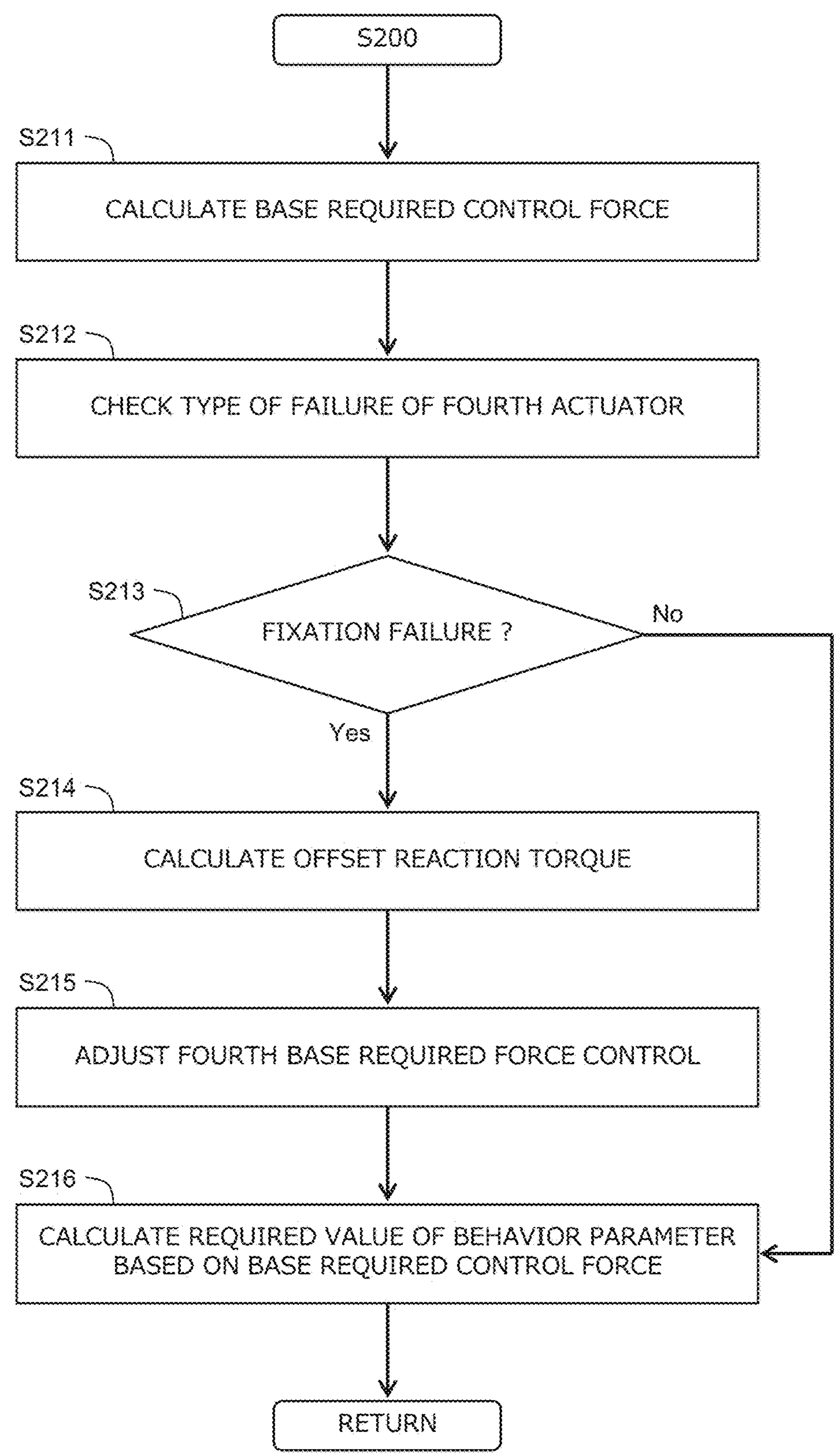
FIG. 8 is a flowchart showing a process executed by the controller according to the embodiment for calculating a required value of a behavior parameter.

FIG. 8 is a flowchart showing a process executed by the controller 30 for calculating the required value of the behavior parameter in consideration of the offset reaction force. The process according to the flowchart shown in FIG. 8 is executed when the required value of the behavior parameter is calculated in 3 actuator control (step S200 in FIG. 4).

In step S211, the controller 30 calculates the i-th base required control force for the i-th wheel **14-*i* (i=1 to 3) and the fourth base required control force for the fourth wheel 14-4**.

Next, in step S212, the controller 30 checks the type of failure in the fourth actuator 26-4. For example, the controller 30 checks the type of failure of the fourth actuator 26-4 through a diagnosis system provided in the vehicle 10.

When the failure of the fourth actuator 26-4 is not fixation failure (step S213; No), the process proceeds to step S216. In step S216, the controller 30 calculates the required value of the behavior parameter based on the i-th base required control force and the fourth base required control force without adjusting the fourth base required control force.

When the failure in the fourth actuator 26-4 is fixation failure (step S213; Yes), the controller 30 calculates the offset reaction force that has been generated (step S214, see equations (4) to (6)).

After step S214, in step S215, the controller 30 adjusts the fourth base required control force by subtracting the offset reaction force from the fourth base required control force calculated in step S211 (see equation (3)).

After step S215, in step S216, the controller 30 calculates the required value of the behavior parameter based on the i-th base required control force and the adjusted fourth base required control force.

5.2 Case of Position Control (Angle Control)

As shown in FIG. 7, when the failure of the fourth actuator 26-4 is shut-off failure, the imbalance in suspension hardness occurs. More specifically, the fourth suspension 20-4 is softer than the other suspensions 20 by the amount of the offset reaction force. That is, in the fourth actuator 26-4, the torsion bar reaction force is insufficient by the amount of the offset reaction force. Accordingly, the controller 30 calculates the required value of the behavior parameter so that the offset reaction force caused by the fixation failure is compensated. Specifically, the controller 30 executes the process as follows.

First, the controller 30 adjusts the fourth base required control force by adding the offset reaction force to the fourth base required control force calculated for the fourth wheel 14-4. That is, the adjusted fourth base required control force $F'_{4b}$ is expressed by the following equation (7). Then, the controller 30 calculates the required value of the behavior parameter based on the i-th base required control force calculated for the i-th wheel **14-*i*** and the adjusted fourth base required control force $F'_{4b}$ (see equation (1)).

Formula 7

$$F'_{4b} = F_{4b} + F_{xy} \tag{7}$$

Here, the offset reaction force $F_{xy}$ can be calculated using equations (4) to (6) as in the case of force control (torque control).

In this way, when each actuator 26 is subjected to position control (angle control), the controller 30 can calculate the required value of the behavior parameter in consideration of the offset reaction force. It is thus possible to eliminate the misalignment caused by the offset reaction force in the 3 actuator control. In the case of fixation failure, the offset reaction force is zero. Therefore, in this case, the controller 30 may calculate the required value of the behavior parameter in the same manner as in the case of the normal control.

Figure 9:
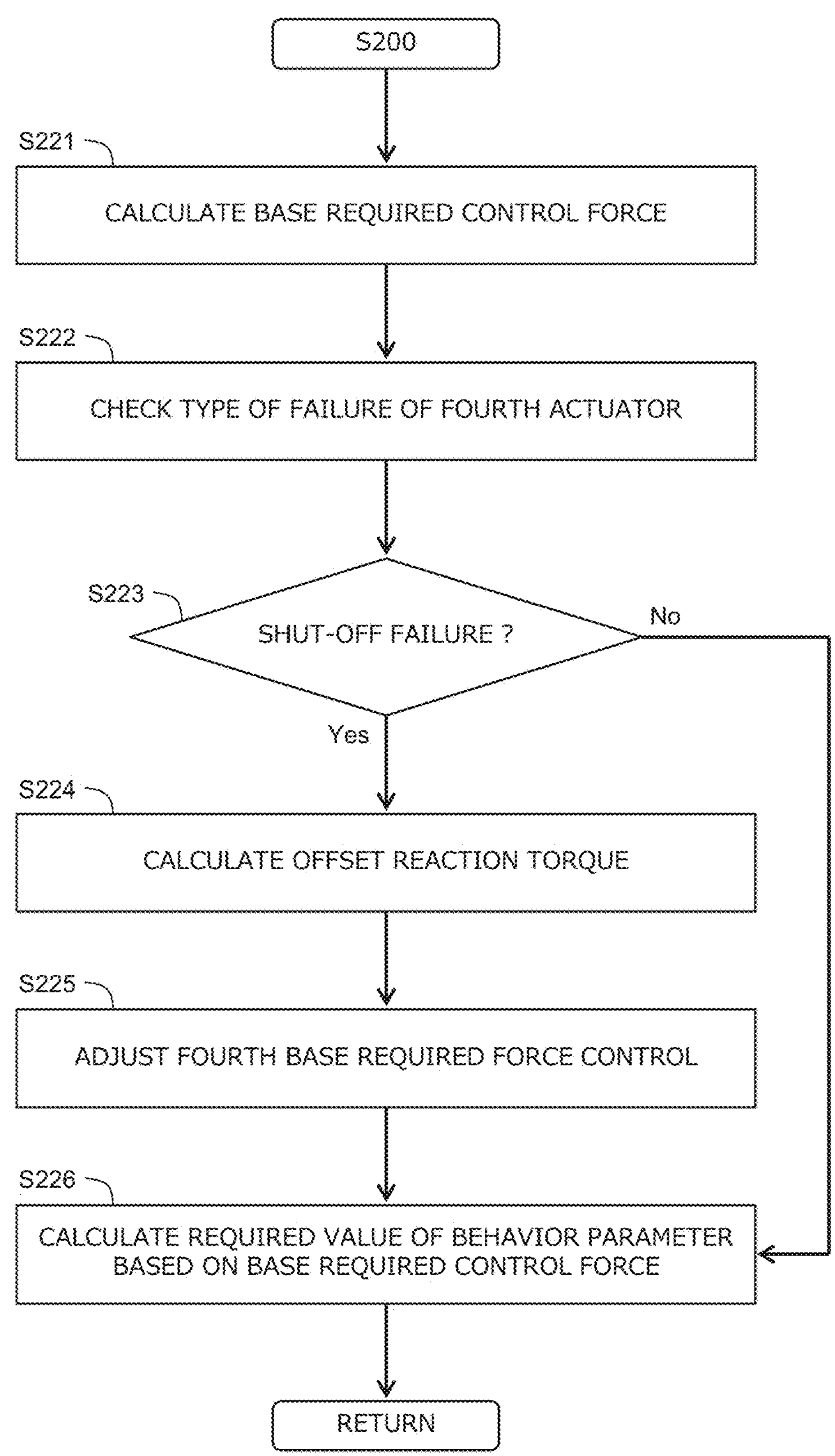
FIG. 9 is a flowchart showing a process executed by the controller according to the embodiment for calculating the required value of the behavior parameter.

FIG. 9 is a flowchart showing a process executed by the controller 30 for calculating the required value of the behavior parameter in consideration of the offset reaction force. The process according to the flowchart shown in FIG. 9 is executed when the required value of the behavior parameter is calculated in 3 actuator control (step S200 in FIG. 4).

The processes in steps S221 and S222 are equivalent to the processes in steps S211 and S212 in FIG. 6.

When the failure in the fourth actuator 26-4 is not shut-off failure (step S223; No), the process proceeds to step S226. In step S226, the controller 30 calculates the required value of the behavior parameter based on the i-th base required control force and the fourth base required control force without adjusting the fourth base required control force.

When the failure in the fourth actuator 26-4 is shut-off failure (step S223; Yes), the controller 30 calculates the offset reaction force that has been generated (step S224, see equations (4) to (6)).

After step S224, in step S225, the controller 30 adjusts the fourth base required control force by adding the offset reaction force to the fourth base required control force calculated in step S221 (see equation (7)).

After step S225, in step S226, the controller 30 calculates the required value of the behavior parameter based on the i-th base required control force and the adjusted fourth base required control force.

What is claimed is:

1. A vehicle behavior control apparatus comprising:

first to fourth suspensions provided on first to fourth wheels of a vehicle, respectively; and a controller for controlling a behavior of the vehicle, wherein the first to fourth suspensions include first to fourth actuators that apply vertical control forces to the first to fourth wheels, respectively, the first to fourth actuators include first to fourth transmission members that transmit reaction forces generated by deformation of the first to fourth transmission members to the first to fourth wheels, respectively, the first to fourth actuators are configured to apply the vertical control forces to the first to fourth wheels by deforming the first to fourth transmission members, respectively, and the controller is configured to, when a failure occurs in the fourth actuator other than the i-th actuator (i=1 to 3) among the first to fourth actuators, execute:

calculating a required value of a behavior parameter representing the behavior of the vehicle in consideration of an offset reaction force, wherein the offset reaction force is a difference in a reaction force generated in the fourth transmission member due to at least one of acceleration, deceleration and steering of the vehicle between when the failure occurs and when the failure does not occur;

converting the required value of the behavior parameter into an i-th required control force for the i-th actuator by conversion processing; and controlling the behavior of the vehicle by controlling the i-th actuator based on the i-th required control force.

2. The vehicle behavior control apparatus according to claim 1, wherein each of the first to fourth transmission members includes a torsion bar.

3. The vehicle behavior control apparatus according to claim 1, wherein the offset reaction force depends on a type of the failure in of the fourth actuator.

4. The vehicle behavior control apparatus according to claim 3, wherein the controller is configured to perform force control on each of the first to fourth actuators, and when the failure in of the fourth actuator is a fixation of an operation position, the controller calculates the required value of the behavior parameter such that the offset reaction force is canceled.

5. The vehicle behavior control apparatus according to claim 4, wherein the controller is further configured to execute:

calculating an i-th base required control force for the i-th wheel and a fourth base required control force for the fourth wheel;

adjusting the fourth base required control force by subtracting the offset reaction force from the fourth base required control force; and calculating the required value of the behavior parameter, which is to be converted into the i-th required control force for the i-th actuator by the conversion processing, based on the i-th base required control force and the adjusted fourth base required control force.

6. The vehicle behavior control apparatus according to claim 3, wherein the controller is configured to perform force control on each of the first to fourth actuators, and the offset reaction force is zero when the failure in the fourth actuator is a shut-off of force transmission via the fourth transmission member or a shut-off of an output of the fourth actuator.

7. The vehicle behavior control apparatus according to claim 3, wherein the controller is configured to perform position control on each of the first to fourth actuators, and when the failure in the fourth actuator is a shut-off of force transmission via the fourth transmission member or a shut-off of an output of the fourth actuator, the controller calculates the required value of the behavior parameter such that the offset reaction force is compensated.

8. The vehicle behavior control apparatus according to claim 7, wherein the controller is further configured to execute:

calculating an i-th base required control force for the i-th wheel and a fourth base required control force for the fourth wheel;

adjusting the fourth base required control force by adding the offset reaction force to the fourth base required control force; and calculating the required value of the behavior parameter, which is to be converted into the i-th required control force for the i-th actuator by the conversion processing, based on the i-th base required control force and the adjusted fourth base required control force.

9. The vehicle behavior control apparatus according to claim 3, wherein the controller is configured to perform position control on each of the first to fourth actuators, and the offset reaction force is zero when the failure in the fourth actuator is a fixation of an operation position.

10. A vehicle behavior control method for controlling a behavior of a vehicle, the vehicle comprising first to fourth suspensions provided on first to fourth wheels of the vehicle, respectively, the first to fourth suspensions including first to fourth actuators that apply vertical control forces to the first to fourth wheels, respectively, the first to fourth actuators including first to fourth transmission members that transmit reaction forces generated by deformation of the first to fourth transmission members to the first to fourth wheels, respectively, the first to fourth actuators configured to apply the vertical control forces to the first to fourth wheels by deforming the first to fourth transmission members, respectively, the vehicle behavior control method, when a failure occurs in the fourth actuator other than the i-th actuator (i=1 to 3) among the first to fourth actuators, including:

calculating a required value of a behavior parameter representing the behavior of the vehicle in consideration of an offset reaction force, wherein the offset reaction force is a difference in a reaction force generated in the fourth transmission member due to at least one of acceleration, deceleration and steering of the vehicle between when the failure occurs and when the failure does not occur;

converting the required value of the behavior parameter into an i-th required control force for the i-th actuator by conversion processing; and controlling the behavior of the vehicle by controlling the i-th actuator based on the i-th required control force.

11. A non-transitory computer readable recording medium on which a computer program for controlling a behavior of a vehicle is recorded, the vehicle comprising first to fourth suspensions provided on first to fourth wheels of the vehicle, respectively, the first to fourth suspensions including first to fourth actuators that apply vertical control forces to the first to fourth wheels, respectively, the first to fourth actuators including first to fourth transmission members that transmit reaction forces generated by deformation of the first to fourth transmission members to the first to fourth wheels, respectively, the first to fourth actuators configured to apply the vertical control forces to the first to fourth wheels by deforming the first to fourth transmission members, respectively, the computer program causing a computer to, when a failure occurs in the fourth actuator other than the i-th (i=1 to 3) among the first to fourth actuators, execute:

calculating a required value of a behavior parameter representing the behavior of the vehicle in consideration of an offset reaction force, wherein the offset reaction force is a difference in a reaction force generated in the fourth transmission member due to at least one of acceleration, deceleration and steering of the vehicle between when the failure occurs and when the failure does not occur;

converting the required value of the behavior parameter into an i-th required control force for the i-th actuator by conversion processing; and controlling the behavior of the vehicle by controlling the i-th actuator based on the i-th required control force.

* * * * *